(12) United States Patent
Ito (10) Patent No.: US 6,504,623 B1
(45) Date of Patent: Jan. 7, 2003

(54) PRINTING APPARATUS, A CONTROL METHOD THEREFOR AND A COMPUTER READABLE INFORMATION STORAGE MEDIUM FOR RECORDING A CONTROL PROGRAM THEREFOR

(75) Inventor: Yoshikazu Ito, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/222,233

(22) Filed: Dec. 29, 1998

(30) Foreign Application Priority Data

Jan. 5, 1998 (JP) .......................................... 10-000034

(51) Int. Cl.[7] .............................................. G06F 15/00
(52) U.S. Cl. ........................ 358/1.18; 235/475; 235/476
(58) Field of Search ............................... 358/1.18, 1.12, 358/1.1, 1.6, 1.13; 347/138; 364/519; 705/18; 235/375, 475, 476; 400/73

(56) References Cited

U.S. PATENT DOCUMENTS 5,053,607 A * 10/1991 Carlson et al. ............... 705/18
6,290,129 B2 * 9/2001 Momose ..................... 235/449

FOREIGN PATENT DOCUMENTS

JP         7-33307        2/1995

* cited by examiner

*Primary Examiner*—Mark Wallerson
*Assistant Examiner*—Twyler Lamb
(74) *Attorney, Agent, or Firm*—Michael T. Gabrik (57) ABSTRACT

A multiple function printer for reliably re-magnetizing MICR character on a cut-sheet form without regard to operator experience or the manner in which the form is inserted method. The transportation mechanism of the printer drives the cut-sheet form inserted in an insertion opening of the printer in reverse until the leading edge of the form is detected by a top-of-form (TOF) detector disposed in the insertion opening. Next, the cut-sheet form 5 is fed in reverse to position the beginning of the MICR characters on the form within the effective flux density range of the magnetizing magnet 17. The cut-sheet form is then advanced forward from this position to re-magnetize and then read the MICR characters using a magnetic head.

19 Claims, 7 Drawing Sheets

PRINTING APPARATUS, A CONTROL METHOD THEREFOR AND A COMPUTER READABLE INFORMATION STORAGE MEDIUM FOR RECORDING A CONTROL PROGRAM THEREFOR

BACKGROUND OF THE INVENTION

1. Field of the Invention

The present invention relates generally to an apparatus for printing a cut-sheet form, and relates more particularly to a multiple function printing apparatus capable of reading a magnetic pattern on the cut-sheet form. The present invention further relates to a method for controlling a multiple function printing apparatus and a recording medium for recording a computer program embodying the control method of the invention.

2. Description of the Related Art

Cash, credit cards, and personal checks are typically used for completing financial transactions at the point of sale (POS processing). Customer account information, the serial number of the check, and other tracking information are typically printed on the face of the check using magnetic ink and MICR (magnetic ink character recognition) characters. One POS application for MICR characters is determining check validity, which is accomplished by referencing this account information.

POS processing of a check with MICR characters involves scanning the information on the check face using an MICR reader, and then placing the check in the printer for endorsing the back of the check. Whereas this process may involve two devices, the MICR reader and printer, multiple function printers having an integrated MICR reader and a print head for check endorsing have also been developed to complete these two tasks with a single apparatus, referred to below as a multiple function printer.

Printers for printing to cut-sheet forms typically have a form stopper disposed on the form insertion opening as a means for regulating the printing position for the cut-sheet form. When a form is inserted to the position determined by this form stopper and the printer detects that a form is present, a paper transportation mechanism such as a pair of transport rollers holds the form and automatically advances the form along a paper path in the direction toward the print head.

Some multiple function printers having an MICR character reader function have a paper transportation mechanism which is commonly used for both printing to cut-sheet forms and processing checks and is capable of feeding the checks along a magnetic head which serves as a MICR character reader. In these devices, a permanent magnet is also located before the magnetic head in order to re-magnetize the MICR characters so that it can be read by the magnetic head.

Checks and other cut-sheet forms can, however, be inserted in various ways by different operators. For example, while the normal method may be to align the edge of the check or form with a paper guide for guiding a side edge of the check or form so that it is inserted straight with respect to the form stopper, the check or form may also be inserted at an angle or sideways. Therefore, if the magnet for re-magnetizing the ink is disposed on the insertion opening, a check can be inserted such that the beginning of the MICR characters does not pass the magnet and is therefore not magnetized. Reading the MICR characters will therefore also be unsuccessful. This means that check validity cannot be determined, and the process must be repeated, starting with reinserting the check.

3. Objects of the Invention

It is, therefore, an object of the present invention to provide a printing apparatus to overcome the aforementioned problems.

It is a further object of this invention to provide a printing apparatus which improves magnetic pattern reading and has excellent operability and reliability characteristics.

It is another object of this invention to provide a printing apparatus capable of reliably re-magnetizing a magnetic pattern on a check or other print form irrespective of operator experience and how a form is inserted.

It is still another object of this invention to provide a control method for a printing apparatus which improves magnetic pattern reading, and an information storage medium storing a control program embodying this control method.

SUMMARY OF THE INVENTION

To achieve the above-described objects, the present invention reverses a recording medium such as a cut-sheet form set in the insertion opening to position the beginning of a magnetic pattern on the cut-sheet form relative to a magnetizer, thereby assuring that the entire magnetic pattern will pass near the magnetizer and be magnetized.

More specifically, a printing apparatus according to a first aspect of the present invention comprises: an insertion opening into which a recording medium is inserted to a specific position; a printing mechanism to print on the recording medium; a magnetizer, disposed on the upstream side of the specific position in the insertion opening relative to a first direction, to re-magnetize a magnetic pattern if imprinted on the recording medium; a magnetic pattern detector to read or detect the magnetic pattern re-magnetized by the magnetizer; a recording medium detector, disposed between the magnetizer and the magnetic pattern detector, to detect the recording medium; a transportation mechanism to selectively transport the recording medium detected by the recording medium detector from the specific position in the insertion opening in the first direction from the magnetizer toward the magnetic pattern detector and in a second direction opposite the first direction; and a control unit for controlling the transportation mechanism to transport the recording medium set in the insertion opening in the first direction to print on the recording medium if the recording medium does not have a magnetic pattern imprinted thereon and in the second direction, if the recording medium has a magnetic pattern imprinted thereon, to position the beginning of the magnetic pattern within the insertion opening where the flux density of the magnetizer is sufficient to re-magnetize the beginning of the magnetic pattern.

A printing apparatus control method according to the present invention is directed to the control of a printing apparatus. The control method comprises detecting a recording medium set in an insertion opening of the printing apparatus; determining whether the recording medium has a magnetic pattern imprinted thereon; and selectively transporting the recording medium, set to a specific position in an insertion opening, in a first direction from the magnetizer toward the magnetic pattern detector to print on the recording medium and in a second direction opposite the first direction. The recording medium is transported in the first direction for printing if the recording medium does not have a magnetic pattern imprinted thereon. However, if the recording medium has a magnetic pattern, the recording medium is transported in the second direction, to re-magnetize the magnetic pattern by means of a magnetizer disposed upstream of the specific position in the insertion opening relative to the first direction, and is then transported in the first direction toward a magnetic head to read the magnetic pattern. The second-direction transportation step transports the recording medium set in the insertion opening in the second direction to position the beginning of the magnetic pattern within the insertion opening where the flux density of the magnetizer is sufficient to re-magnetize the beginning of the magnetic pattern.

In a printing apparatus and control method therefor, according to the present invention, the insertion position of the recording medium such as a cut-sheet form within the insertion opening is regulated by a form stopper or other construction for positioning the cut-sheet form to a specific position. The cut-sheet form thus positioned is transported in the reverse direction, that is, opposite the insertion direction, until the beginning of a magnetic pattern on the cut-sheet form is at least approximately aligned with the center of the magnetizer to position the beginning of the magnetic pattern in an effective magnetization area, that is, in an area in which the flux density of the magnetizer is sufficient to re-magnetize the beginning of the magnetic pattern. When the form is then transported from this initial re-magnetizing position, the entire magnetic pattern passes through the effective magnetization area of the magnetizer. As a result, the entire magnetic pattern can be reliably re-magnetized.

By first reversing the cut-sheet form so that the beginning of the magnetic pattern is appropriately positioned relative to the magnetizer before starting the magnetic pattern re-magnetizing process, the magnetic pattern can be reliably re-magnetized irrespective of how the cut-sheet form was inserted into the insertion opening, that is, regardless of operator training and experience or the method of cut-sheet form insertion. Such a printing apparatus provides excellent operability and reliability and prevents problems such as part of the MICR character pattern not being re-magnetized and a corresponding waveform signal not being obtained.

In the magnetizing process, the transportation mechanism/control unit or reverse-direction transportation process preferably transports the cut-sheet form in a second, or reverse, direction (that is, opposite the first forward direction) until the beginning of the magnetic pattern is substantially aligned with the center of the magnetizer. As a result, the beginning of the magnetic pattern is positioned where the flux density of the magnetizing part is greatest. When the cut-sheet form is then advanced forward, the entire magnetic pattern will pass this greatest flux density area to improve the reliability of the re-magnetizing process. The form transportation distance is also shorter than when the form is reversed until the beginning of the magnetic pattern passes the magnetizer to accelerate the magnetizing process.

In a printing apparatus according to the present invention the recording medium detector detects the leading edge of a cut-sheet recording medium. In this case, the control unit controls the transportation mechanism to transport the recording medium in the second or reverse direction until the leading edge of the cut-sheet recording medium is detected, and then further transports the cut-sheet recording medium in the second direction until the beginning of the magnetic pattern is positioned where the flux density of the magnetizer is sufficient to re-magnetize the beginning of the magnetic pattern.

A cut-sheet form may be inserted in various ways by different operators. If a form is inserted forcefully against the form stopper, the form can easily curve or buckle inside the insertion opening. It should be noted that it is possible to assume that cut-sheet forms will be inserted into the insertion opening appropriately such that the leading edge of the form contacts a form stopper and is not curved inside the insertion opening, and then reverse the form a specific distance to position the beginning of the magnetic pattern to the magnetizer. The specific transportation distance here is determined based on this assumption. However, if the form is not inserted in this prescribed manner, that is, if the form is bent or curved inside the insertion opening, the form will not be reversed a sufficient distance, and the beginning of the magnetic pattern may not be reversed to the appropriate position relative to the magnetizer.

The printing apparatus and control method therefor, according to the present invention, may be used to compensate for this condition. In this case, the cut-sheet form is first reversed until the leading edge thereof is detected by a form detector. As a result, a form can be reliably reversed to a position at which the beginning of the magnetic pattern is appropriately positioned relative to the magnetizer regardless of the condition of the cut-sheet form in the insertion opening.

A printing apparatus and a printing apparatus control method according to the present invention further preferably comprise a medium detector for detecting the cut-sheet recording medium set to a specific position in the insertion opening; and a means or process for transporting the cut-sheet recording medium in the second direction until the beginning of the magnetic pattern reaches a position at which the flux density of the magnetizer is sufficient for re-magnetizing after the cut-sheet recording medium set in the insertion opening is detected. In this case, form transportation can begin immediately to implement the magnetic pattern re-magnetizing process according to the form detection result, and the re-magnetizing process can thus be accelerated.

A printing apparatus and a printing apparatus control method according to another aspect of the present invention comprises a means or process for transporting the cut-sheet recording medium set in the insertion opening in the second direction until the beginning of the magnetic pattern is in an area where the flux density of the magnetizer is sufficient for re-magnetizing before the cut-sheet recording medium is advanced toward the magnetic head. Magnetic pattern reading can thus proceed continuously from magnetic pattern re-magnetization, demagnetization of the magnetic pattern can be minimized, and the reliability of magnetic pattern reading can be improved.

A printing apparatus and a printing apparatus control method according to another aspect of the present invention comprises a means or process for transporting the cut-sheet recording medium in the second direction until a beginning of the magnetic pattern reaches a position where the flux density of the magnetizer is sufficient for re-magnetizing, after a magnetic pattern is detected on the cut-sheet recording medium. For example, if there is no magnetic pattern on the cut-sheet form, a magnetic pattern read command is not issued from the host. As a result, the re-magnetizing and magnetic pattern reading operations can be skipped, and only the operations required for printing performed. A printing apparatus with improved user friendliness and faster processing can thus be provided.

The printing apparatus control method of the present invention can also be embodied as a control program having commands that can be executed by a controller for performing processes corresponding to the various steps and operations described above. This control method and control program can also be provided using any medium on which the control program can be recorded, stored, or transmitted. For example, the control program can be transmitted via the Internet or other computer network, and recorded to a local storage medium that can be used by a personal computer, printing apparatus, or other operator-side hardware device.

Other objects and attainments together with a fuller understanding of the invention will become apparent and appreciated by referring to the following description and claims taken in conjunction with the accompanying drawings.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

Figure 1:
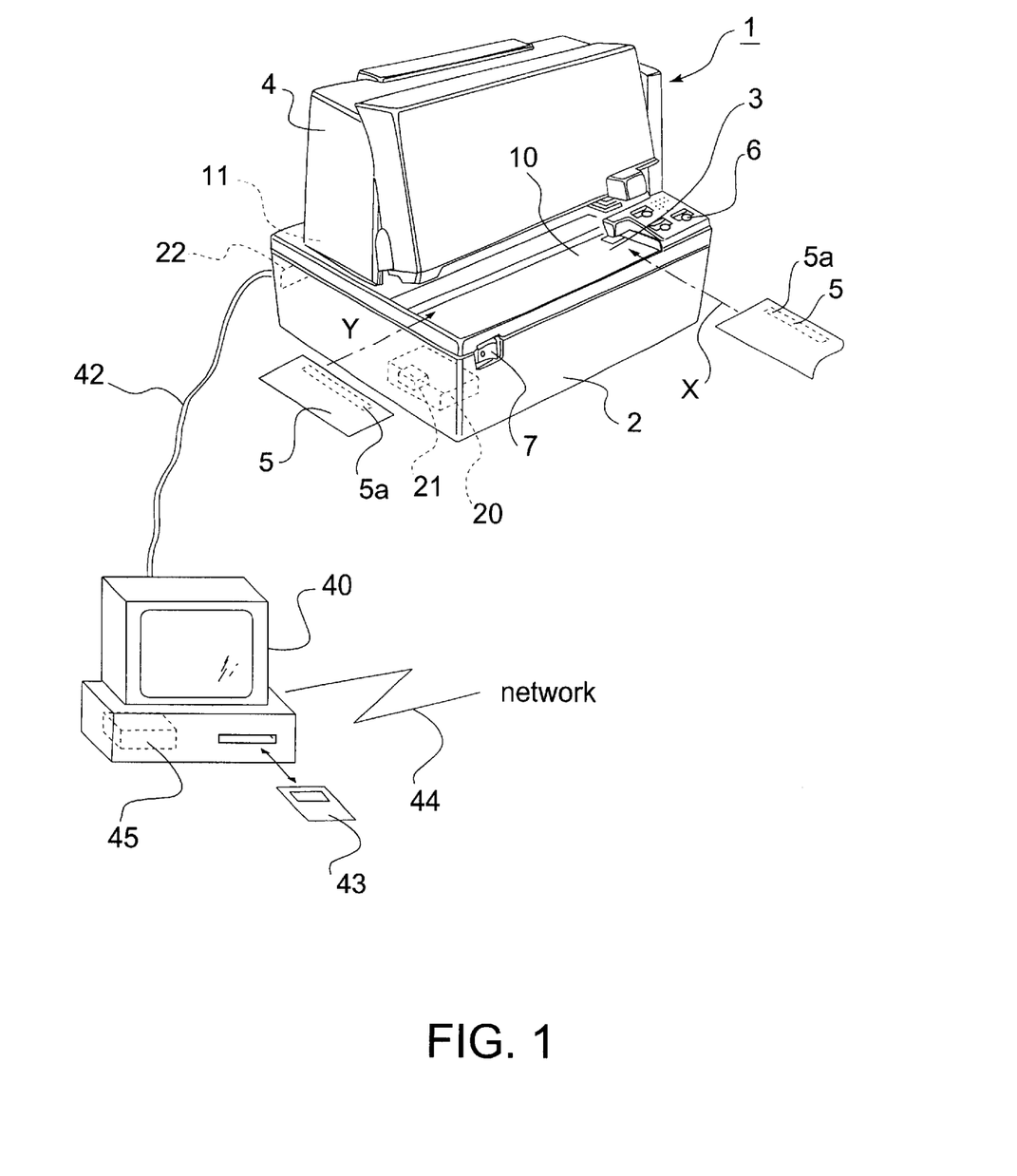
FIG. 1 is an oblique view of the appearance of a multiple function printer according to a preferred embodiment of the present invention.

KEY TO THE FIGURES 1 multiple function printer
5 cut-sheet form
5a MICR characters
5b leading edge (of cut-sheet form)
5c beginning of MICR characters
6 operating panel
10 insertion opening
11 paper path
14 paper transportation mechanism
15 platen
16 form stopper
22 host-printer interface
ST1 MICR character read command detected?
ST2 Wait for form insertion
ST3 Personal check detected?
ST4 Reverse feed
ST5 Leading edge of form detected?
ST6 Reverse feed until beginning of MICR characters is centered on magnet
ST7 Re-magnetize
ST8 Read MICR characters
ST9 Print
end

DESCRIPTION OF THE PREFERRED EMBODIMENTS

A printing apparatus according to a preferred embodiment of the present invention is described below with reference to the accompanying figures. FIG. 1 is an oblique view showing the appearance of a multiple function printer 1 according to a preferred embodiment of the present invention, and FIG. 2 shows the arrangement and positioning of components along the paper path 11 in the multiple function printer 1 shown in FIG. 1.

Figure 2:
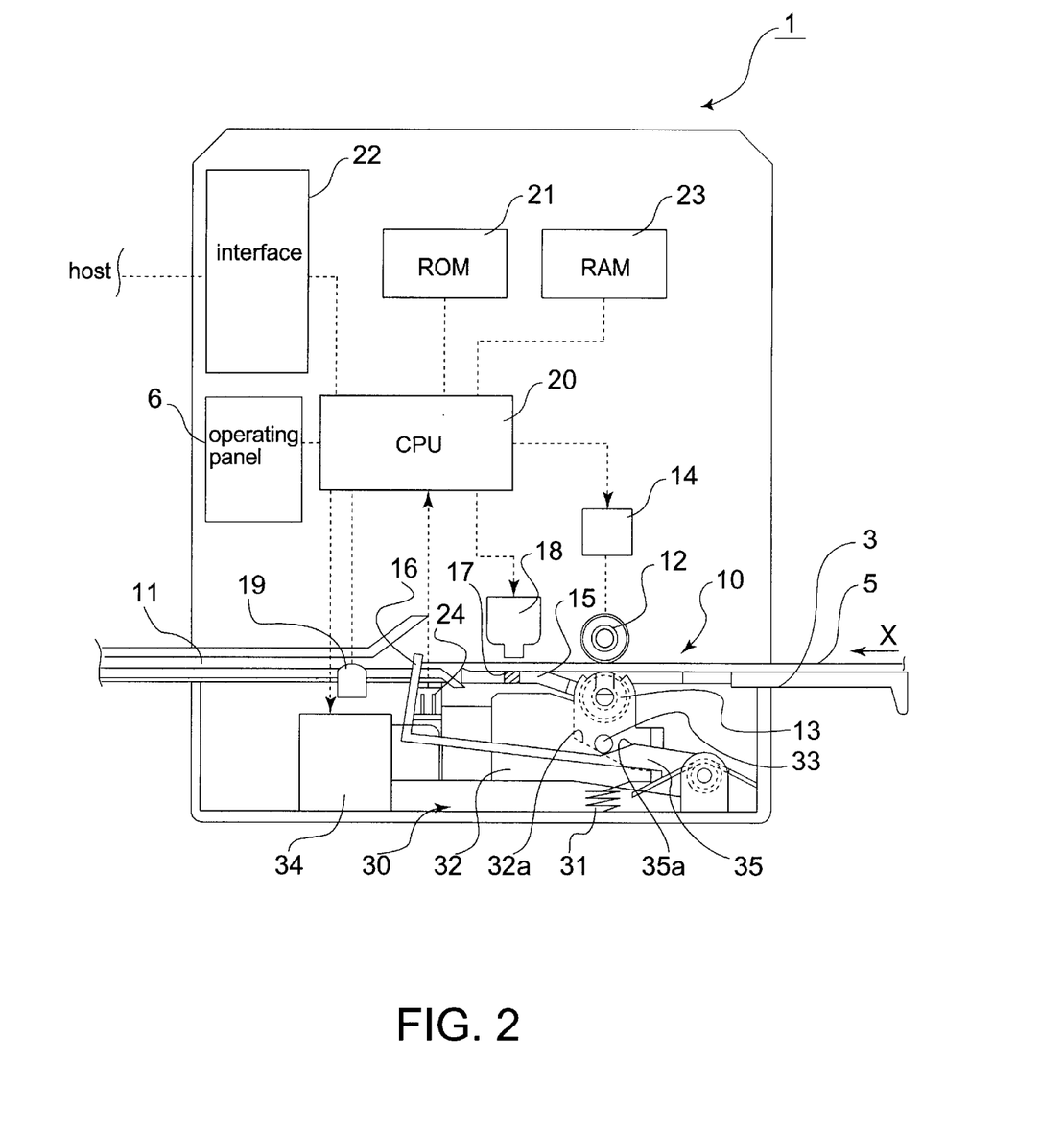
FIG. 2 is a block view of the multiple function printer shown in FIG. 1.

As shown in FIG. 1 and FIG. 2, a multiple function printer 1 according to this preferred embodiment of the invention comprises a base unit 2 and a top cover 4 attached at substantially the middle of the base unit 2. The base unit 2 has a rectangular box-like shape with the top surface thereof serving as a table 3. A paper path 11 and insertion opening 10 for a cut-sheet form (check) 5 is provided in the gap formed between the base unit 2 and top cover 4.

The insertion opening 10 enables a cut-sheet form 5 to be inserted in a direction (the X direction) substantially in line with the paper path 11, and also in a direction (the Y direction) perpendicular to the paper path 11. Insertion in the Y direction is possible to enable printing to a cut-sheet form that is wider than the width of the table 3. As will be further described below, the print head also moves reciprocally in the Y direction. As a result, it is also possible to insert a cut-sheet form from the side with a desired printing position on the form aligned with the print head so that the printer prints to the desired position on the form. It is convenient for facilitating printing to a desired position on the form to construct the printer to allow the Y direction insertion.

An operating panel 6 for local printer operations is provided on the right side of the table 3 as shown in FIG. 1, and a power switch 7 is provided on the base unit 2. This multiple function printer 1 further comprises a CPU 20 for controlling various functions of the printer 1 according to a control program and instructions entered using the operating panel 6. A ROM 21 stores the control program and various settings, and a RAM 23 temporarily stores MICR data and print data.

The multiple function printer 1 is further connected to a host device, such as a personal computer 40 or POS terminal by, for example, an interface cable 42 or infrared communications interface, thereby enabling print data and control information to be communicated between the printer 1 and host. The multiple function printer 1 can be controlled by sending control commands and print data from an application program running on the personal computer 40 or other host.

If the ROM 21 is an EEPROM or other rewritable nonvolatile memory, a control program, for example, can be sent from the host via an interface 22 and written to ROM 21. A control program supplied to the personal computer 40, POS terminal or other host can thus be sent from the host to the multiple function printer 1.

A control program can be supplied to the host device using various means and media. For example, the control program can be supplied on a floppy disk 43, ROM, or other portable recording medium. Alternatively, the host can comprise a communications function for accessing the Internet or other computer network 44, in which case a control program can be received over the network, stored to a local storage medium such as a hard disk 45, and then transferred to the multiple function printer 1. In addition, a LAN driver can be incorporated into the multiple function printer 1, thereby enabling the multiple function printer 1 to be directly connected to the network. In this case, the control program as well as print data and control commands can be supplied over the network to the multiple function printer 1.

Referring to FIG. 2, a multiple function printer 1 according to this preferred embodiment is described in further detail below.

Figure 6A:
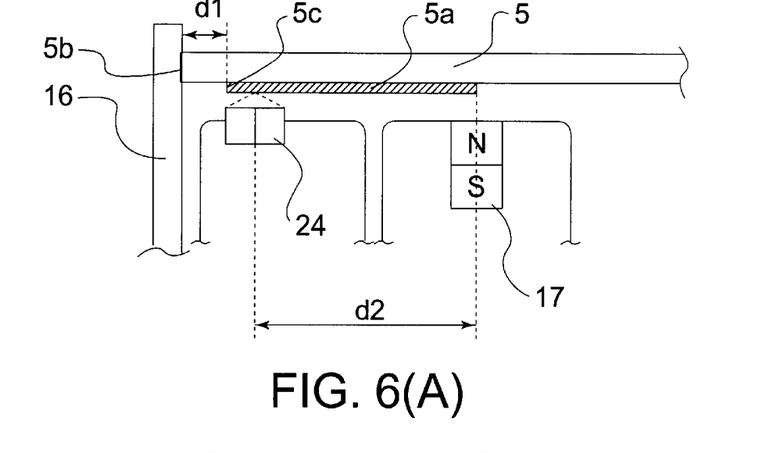
FIGS. 6(A), 6(B) and 6(C) each illustrate a cut-sheet form inside the insertion opening during re-magnetization of MICR characters on the cut-sheet form.

In this multiple function printer 1, the insertion opening 10 is formed by the base unit 2 and top cover 4. A horizontally extending paper path 11 is linked to the insertion opening 10. Along the insertion opening 10, in order from the open side of the insertion opening 10 to the ejection side of the paper path 11, the following components are disposed: a paper transportation mechanism 14 comprising a transportation roller 12 and presser roller 13, a platen 15, a top-of-form (TOF) detector 24 for detecting the leading edge 5b (see FIG. 6) of cut-sheet form 5, and an operable form stopper 16 for setting the position of an inserted cut-sheet form 5 by stopping the leading edge of the cut-sheet form 5 inserted in the insertion opening 10.

A magnet 17 for re-magnetizing MICR characters 5a on the cut-sheet form 5 is embedded in front of the platen 15. A print head 18 is provided opposite the platen 15.

A magnetic head 19 for reading MICR characters 5a (see FIG. 1) is provided along the paper path 11 downstream of the form stopper 16 in the form insertion direction (i.e., in the X direction).

A multiple function printer 1 according to this preferred embodiment further comprises a platen drive mechanism 30 for moving the platen 15 up and down. After MICR characters 5a reading is completed and the cut-sheet form 5 is returned to a specific position in the insertion opening 10, the platen drive mechanism 30 pushes the platen 15 toward the print head 18 to enable printing on the cut-sheet form 5.

The platen drive mechanism 30 comprises: a platen frame 32 that functions by means of a spring 31 to push the platen 15 upward as shown in FIG. 2; a platen operating shaft 33 in contact with an inclined part 32a of the platen frame 32 for controlling the vertical movement of the platen frame 32; and a solenoid 34 for moving the position of the platen operating shaft 33. When the platen operating shaft 33 is moved sideways as seen in FIG. 2 by the solenoid 34, the platen frame 32 moves up or down. As a result, the platen 15 can be advanced into and retracted from the paper path of the insertion opening 10. Linked to platen frame 32 operation, the cut-sheet form 5 is held by the presser roller 13 and transportation roller 12 of the paper transportation mechanism 14, thereby setting the paper transportation mechanism 14 to an operating state in which a cut-sheet form 5 can be transported by the paper transportation mechanism 14. It will thus be obvious that in a multiple function printer 1 according to this preferred embodiment the paper transportation mechanism 14 switches between operating and non-operating states in conjunction with platen 15 movement.

The platen operating shaft 33 also contacts an inclined part 35a of a form stopper frame 35 pivotably supporting the form stopper 16. Note that the inclined part 35a of the form stopper frame 35 slopes in a direction opposite that of the inclined part 32a of the platen frame 32. As a result, when the platen operating shaft 33 moves to raise the platen 15, the form stopper 16 simultaneously descends, thereby opening the transportation path. As a result, when preparations for printing cut-sheet form 5 are completed, the cut-sheet form 5 is transported to an appropriate position by the transportation roller 12, and the print head 18 is moved in a scanning direction orthogonal to the form transportation direction (that is, in the Y direction and in the opposite direction) to print to a desired position on the cut-sheet form 5.

A multiple function printer 1 according to this preferred embodiment is designed for processing personal checks as the printable cut-sheet form 5. Such checks are used for making payment at a retail point-of-sale, and are typically issued by a bank or other financial institution. The user's account information, serial check number, and other information are printed on the front side of the check using MICR characters 5a, which is one type of magnetic pattern. The printing quality and shapes of individual characters in MICR characters 5a are standardized, as is the position to which MICR characters 5a are printed on a check. It is therefore possible to re-magnetize MICR characters 5a on a cut-sheet form 5, and then scan the MICR characters 5a with a magnetic head 19 to obtain a waveform corresponding to each of the MICR characters 5a. The printed information can then be read by analyzing the detected waveform.

When this type of cut-sheet form 5 is inserted to a multiple function printer 1 as described above, the MICR characters 5a are first re-magnetized by the magnetizing magnet 17, and then scanned and read by the magnetic head 19.

Figure 3:
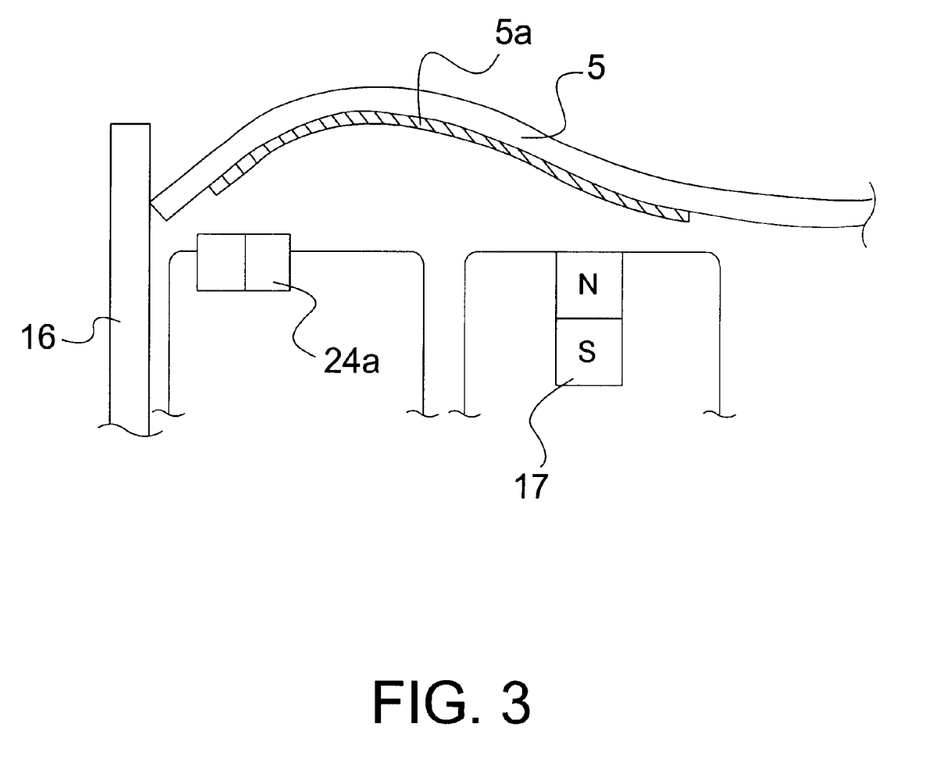
FIG. 3 illustrates a cut-sheet form curved inside the insertion opening.
Figure 4:
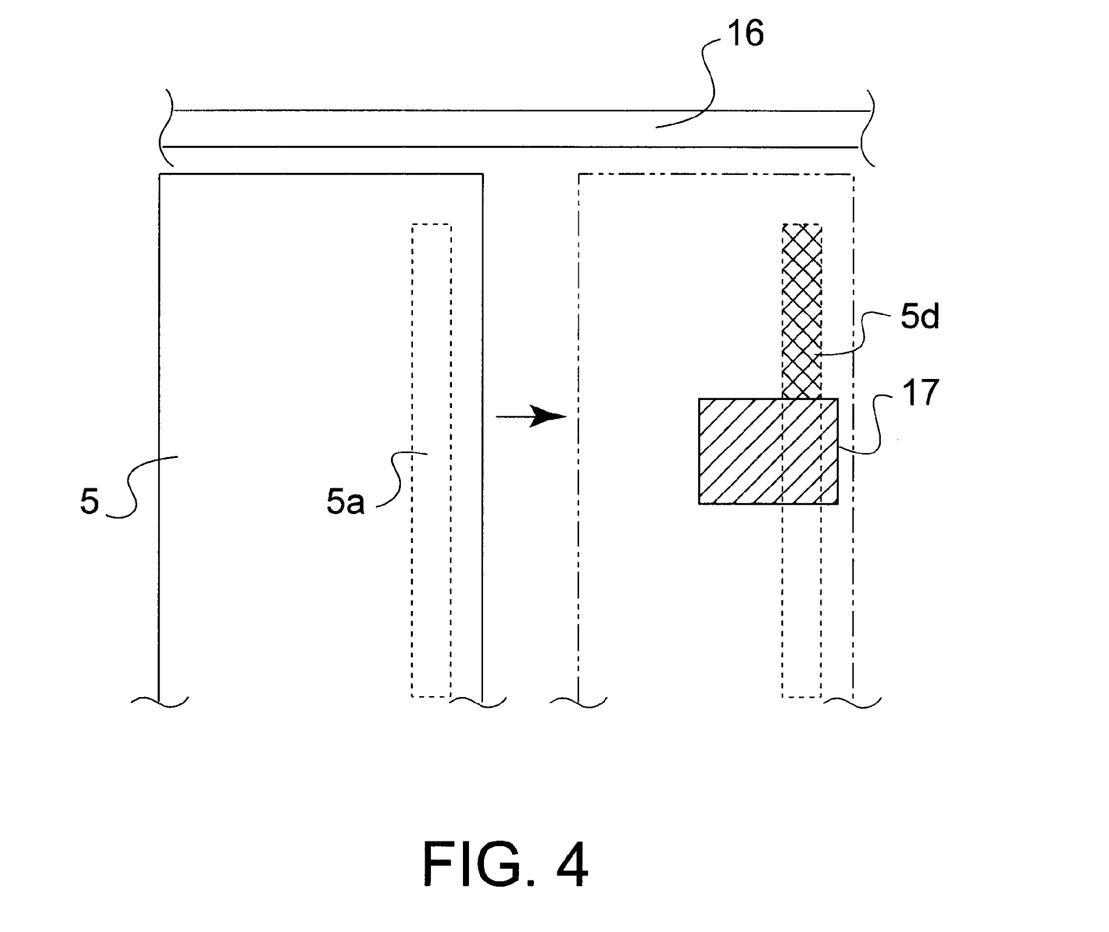
FIG. 4 illustrates a cut-sheet form inserted sideways to the insertion opening.

The cut-sheet form 5, however, is inserted by an operator, and may not be inserted as conceived by the printer designer. As a result, a cut-sheet form 5 may not be inserted into the insertion opening 10 in an appropriate position or way depending upon operator's experience and the cut-sheet form insertion direction. For example, if the cut-sheet form 5 is particularly thin and less rigid, the operator may not notice that the cut-sheet form 5 has been stopped by the form stopper 16. If the cut-sheet form 5 is inserted further after contacting the form stopper 16, it typically becomes curved or buckled inside the insertion opening 10 as indicated in FIG. 3. Furthermore, as illustrated in FIG. 4, if the cut-sheet form 5 is inserted into the paper path from a side position, that is, in the Y direction, part 5d of the MICR characters 5a will not pass the magnetizing magnet 17, and will therefore not be re-magnetized due to insufficient flux density.

Figure 5:
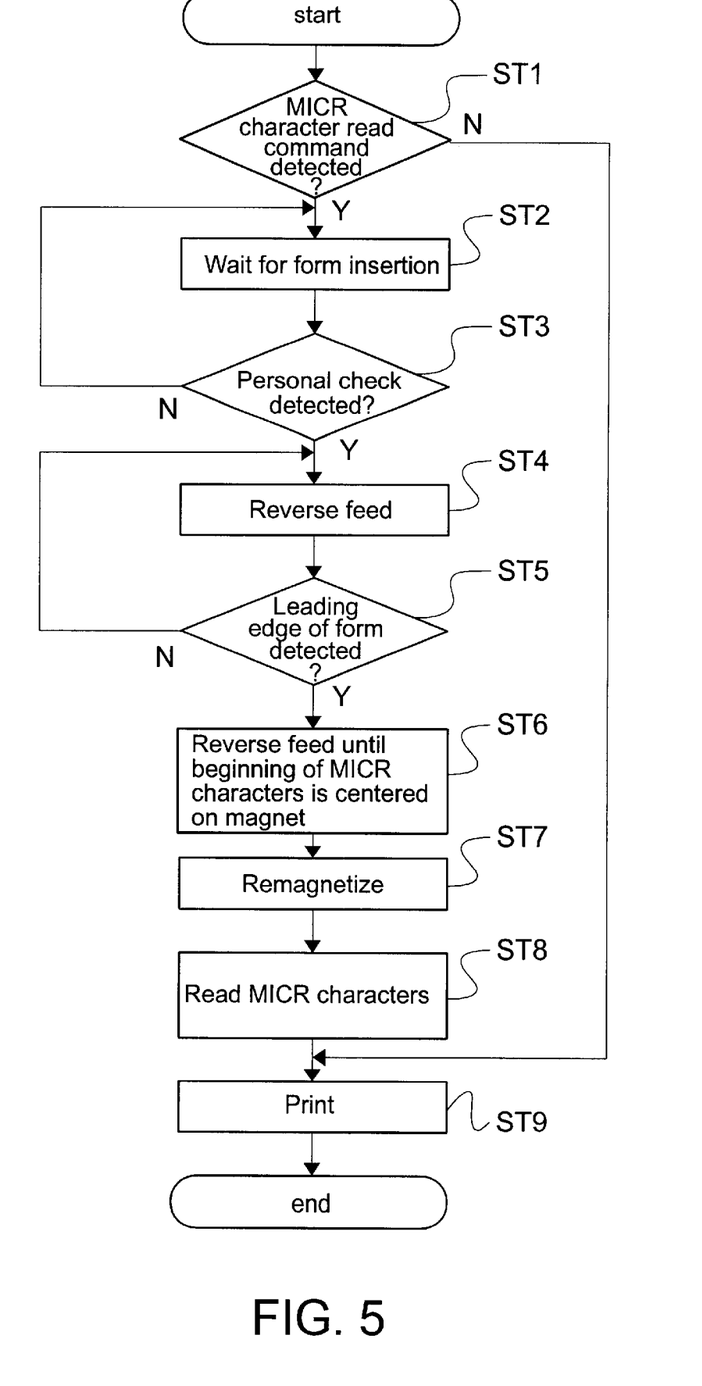
FIG. 5 is a flow chart showing a method for controlling the operation whereby MICR characters on an inserted cut-sheet form are re-magnetized by the multiple function printer shown in FIG. 1.
Figure 6B:
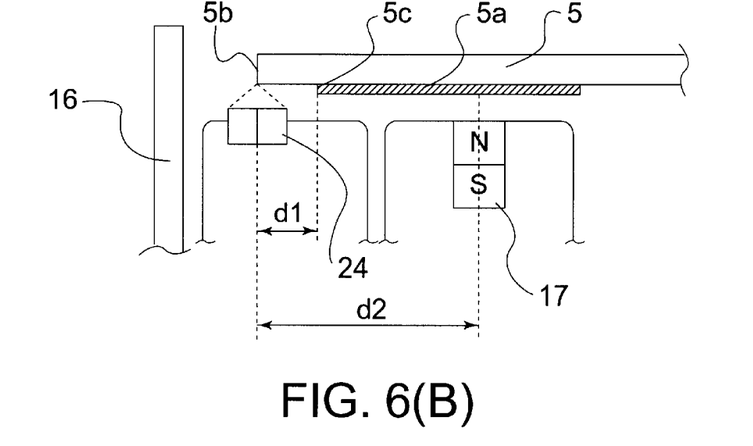
Figure 6C:
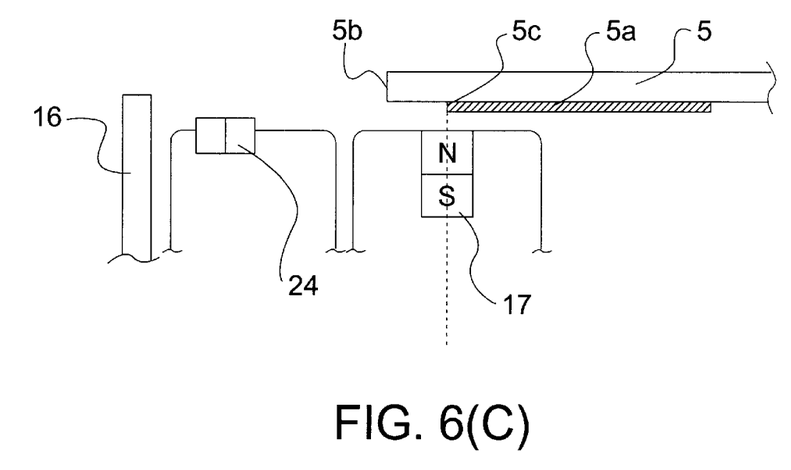

The multiple function printer 1 according to this preferred embodiment overcomes this problem and assures reliable re-magnetization and reading of MICR character 5a on an inserted cut-sheet form 5 by means of the control method described below with reference to FIGS. 5 and 6. FIG. 5 is a flow chart of the operation for re-magnetizing MICR characters 5a on a cut-sheet form 5. FIG. 6 shows the cut-sheet form 5 at typical positions in the insertion opening 10 and paper path at major steps in the control process.

At step ST1 the multiple function printer 1 waits for a command from the personal computer 40 or other host devices instructing MICR character reading. More specifically, the multiple function printer 1 waits for a command from the host for identifying whether MICR characters 5a are present on the inserted cut-sheet form 5. When an MICR character read command is received, the procedure advances to step ST2. That is, MICR character re-magnetizing and reading is performed assuming that MICR characters 5a are provided on an inserted cut-sheet form 5. If the MICR character read command is not issued, the procedure advances to step ST9. In this case, the re-magnetizing and reading steps are skipped, and the printer proceeds directly to the process required for printing.

A multiple function printer 1 according to this preferred embodiment thus determines whether a magnetic pattern is printed on the inserted cut-sheet form 5 based on an MICR read command sent from the host, and performs the following process. It is also possible, of course, to use a method whereby the printer pre-scans the area where MICR characters are expected, and performs the following process if an MICR character pattern is detected.

At step ST2, the printer waits for an cut-sheet form 5 to be inserted into the insertion opening 10. When a cut-sheet form 5 is inserted from either the X direction or Y direction, the leading edge 5b of cut-sheet form 5 contacts the form stopper 16, and the cut-sheet form 5 is thus positioned in the insertion opening 10 in the X direction as shown in FIG. 6(A). It should be noted that the position of the cut-sheet form 5 in the Y direction is determined by the right end of the cut-sheet form 5 contacting a cut-sheet form guide disposed to the right end of the table 3 as shown in FIG. 1. Note, further, that when the cut-sheet form 5 is thus positioned, the beginning 5c of the MICR characters 5a on cut-sheet form 5 are positioned to the inside of the printer from the magnetizing magnet 17, that is, between the magnetizing magnet 17 and form stopper 16. It should be yet further noted that because the magnetizing magnet 17 is a permanent magnet, paper clips, staples, and other metal foreign objects can easily adhere thereto. The magnetizing magnet 17 is therefore preferably disposed where it is easily accessible from the outside of the multiple function printer 1, a cut-sheet form inlet for example.

When a cut-sheet form 5 is detected by the TOF detector 24 (step ST3), the cut-sheet form 5 is transported to the open side of the insertion opening 10 by the paper transportation mechanism 14 (step ST4); that is, the cut-sheet form 5 is transported in reverse. This reverse travel of the cut-sheet form 5 continues until the leading edge 5b of cut-sheet form 5 is again detected by the TOF detector 24. The leading edge 5b is detected by the output from TOF detector 24 going from a "form present" state to a "no form" state.

While the relative positions of the form stopper 16 and TOF detector 24 are already known, it is necessary to detect the leading edge 5b of the cut-sheet form 5 because the cut-sheet form 5 can bend or buckle inside the paper path as shown in FIG. 3. If the cut-sheet form 5 is thus bent and the cut-sheet form 5 is reversed a constant distance determined by the relative positions of the form stopper 16 and TOF detector 24, the leading edge 5b may not reach the TOF detector 24.

When the leading edge 5b of cut-sheet form 5 is then detected by the TOF detector 24 (step ST5) as shown in FIG. 6(B), the procedure advances to step ST6. The cut-sheet form 5 is thus further reversed so that the beginning 5c of MICR characters 5a on cut-sheet form 5 is positioned to substantially the middle of the magnetizing magnet 17 as shown in FIG. 6(C). More specifically, if, as shown in FIG. 6(B), the distance between TOF detector 24 and magnetizing magnet 17 is distance d2, and the distance from the leading edge 5b of cut-sheet form 5 to the beginning 5c of the MICR characters 5a on cut-sheet form 5 is distance d1, the cut-sheet form 5 is reversed (d2–d1) in step ST6.

Figures 7A, 7B:
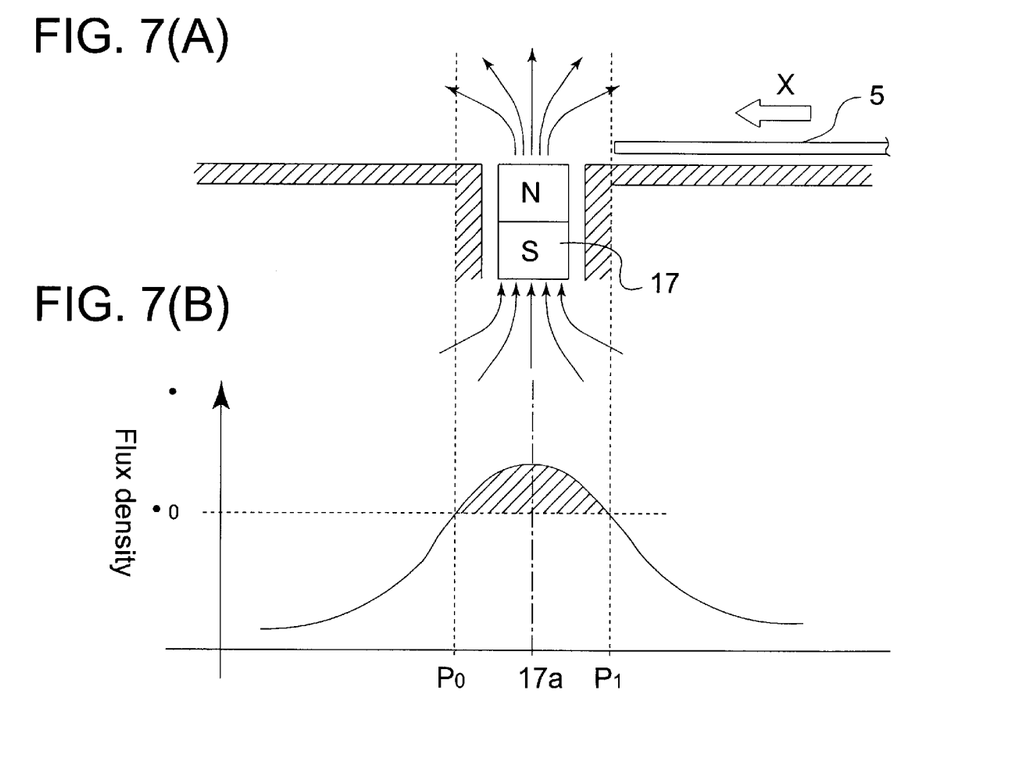
FIGS. 7(A) and 7(B) show the relationship between the position of a moving cut-sheet form and the flux density of the magnet for re-magnetizing the form.

As shown in FIG. 7(A) and FIG. 7(B), the flux density is assumed greatest at the middle of the magnetizing magnet 17, and in this preferred embodiment the beginning 5c of MICR characters 5a is set to this center or high flux density position. However, it is only necessary to position the beginning 5c of MICR characters 5a in the effective flux density range of the magnetizing magnet 17, that is, within the range where the flux density is sufficient to magnetize the MICR characters 5a. That is, if the flux density required to magnetize the MICR characters 5a is $\phi 0$, it is only necessary to reverse the cut-sheet form 5 until the beginning 5c of MICR characters 5a is positioned between points $P_0$ and $P_1$, which defines a range including center 17a of the magnetizing magnet 17. It should be further noted that this range is preferably predetermined, and reflected in the value of the above-noted distance d2.

Next, in step ST7, the form stopper 16 is released and retracted from the paper path, and the cut-sheet form 5 is transported (in the forward direction) to the magnetic head 19 by the paper transportation mechanism 14. As a result, all MICR characters 5a on the cut-sheet form 5 pass through the above-noted effective flux density range of the magnetizing magnet 17, and all of the MICR characters 5a are thus reliably re-magnetized.

After the MICR characters 5a are re-magnetized, they are read by the magnetic head 19 (step ST8). A current waveform representing the MICR characters 5a and obtained by the magnetic head 19 scanning the MICR characters 5a is then analyzed to reproduce the information represented by the MICR characters 5a. This reproduced information is then sent from the printer to the host, which determines check validity based on the reproduced information, and returns the validation result to the printer.

If check validity is confirmed, the cut-sheet form 5 is again reversed toward the open side of the insertion opening 10 by the paper transportation mechanism 14 (step ST9) and is repositioned in the X direction using the TOF detector 24. This is to adjust for any slippage between the paper transportation mechanism 14 and cut-sheet form 5 in the MICR character reading process, and to remove any bending in the cut-sheet form 5 if the form is determined at step ST1 to be a cut-sheet form having no MICR character to be read. Based on control commands and print data received from the host, the print head 18 is then driven to print an endorsement or other information to a specified position on the cut-sheet form 5. Finally, the cut-sheet form 5 is ejected from an ejection opening at the insertion opening 10 or the opposite end of the paper path.

It should be noted that the control method of the present invention is supplied as a control program having commands that can be executed by the CPU 20 to accomplish tasks corresponding to the above-described steps. This control program can be provided via a recording medium from which the control program can be reproduced, or via the Internet or other computer networks, and can be used after recorded in a local storage medium equipped on the operator's personal computer or printing apparatus.

It should be noted that in a multiple function printer 1 according to this preferred embodiment a cut-sheet form 5 set in the insertion opening 10 is reversed to position the beginning 5c of the MICR characters 5a with respect to the magnetizing magnet 17, and then advanced in the forward direction so that all of the MICR characters 5a pass the magnetizing magnet 17. Therefore, even if the cut-sheet form 5 is not appropriately set in the insertion opening 10 due, for example, to operator experience or simply how the cut-sheet form 5 was inserted, the cut-sheet form 5 can be automatically re-inserted in a manner appropriate to re-magnetizing the MICR characters 5a. For example, if the beginning 5c of the MICR characters 5a is not re-magnetized when the cut-sheet form 5 is inserted in the insertion opening 10 as shown in FIG. 4, re-magnetizing of the MICR characters 5a begins after the position of cut-sheet form 5 is automatically corrected so that the cut-sheet form 5 is appropriately positioned for re-magnetizing.

It is therefore possible to avoid the problems resulting from a signal waveform corresponding to the MICR characters 5a not being detected because all of the MICR characters 5a on a cut-sheet form 5 transported in the forward direction can be reliably re-magnetized. A multiple function printer 1 according to this preferred embodiment can therefore be easily used by inexperienced operators, and a multiple function printer 1 with high reliability MICR character reading can be provided.

Furthermore, the MICR character re-magnetizing process carried out in a multiple function printer 1 according to this preferred embodiment of the invention is highly reliable because all of the MICR characters 5a pass through the effective flux density range of the magnetizing magnet 17 as a result of the beginning 5c of the MICR character 5a being reversed and positioned to substantially the center of the magnetizing magnet 17. This process can also be completed faster and more conveniently because the cut-sheet form 5 transportation distance is shorter compared with reversing the beginning 5c of the MICR characters 5a beyond the magnetizing magnet 17.

In a multiple function printer 1 according to this preferred embodiment of the present invention, the cut-sheet form 5 is reversed until the leading edge 5b of the cut-sheet form 5 is detected by the TOF detector 24 before the cut-sheet form 5 is reversed to position the beginning 5c of the MICR characters 5a to the magnetizing magnet 17. If the beginning 5c of the MICR characters 5a is positioned with respect to the magnetizing magnet 17 based on an assumption that the leading edge of the cut-sheet form 5 is appropriately contacting the form stopper 16, reversing the cut-sheet form 5 will be insufficient to reliably locate the MICR characters 5a to the magnetizing magnet 17 if the cut-sheet form 5 is curved in the insertion opening 10 (see FIG. 3). However, a multiple function printer 1 according to this preferred embodiment first readjusts the position of the cut-sheet form 5 by reversing the cut-sheet form 5 until the leading edge 5b thereof is detected by the TOF detector 24. It is therefore possible to reverse the cut-sheet form 5 so that the beginning 5c of the MICR characters 5a are appropriately positioned with respect to the magnetizing magnet 17 irrespective of the position to which the cut-sheet form 5 is inserted in the insertion opening 10.

As further described above, reverse transportation of the cut-sheet form 5 begins immediately after the cut-sheet form 5 is detected by the TOF detector 24 in a multiple function printer 1 according to this preferred embodiment of the present invention. The transition to the MICR character re-magnetizing process is therefore fast, and faster completion of the re-magnetizing process is thus promoted.

Yet further, MICR character re-magnetizing and reading are continuous consecutive operations in a multiple function printer 1 according to this preferred embodiment of the present invention. Demagnetization of the MICR characters 5a can thus be minimized, and high reliability MICR character reading can be achieved.

As also described above, a multiple function printer 1 according to this preferred embodiment of the present invention can skip the MICR character re-magnetizing and reading processes and proceed with the processes required for printing when a command indicating that MICR characters 5a are not on the cut-sheet form 5 is received from the host, or an MICR character read command is not received such as when a mode for printing to standard cut-sheet forms is selected. For example, if there is no MICR characters 5a on the cut-sheet form, a magnetic pattern read command or a command for selecting a MICR character read mode is not sent from the host. As a result, the re-magnetizing process and reading process can be skipped, and processes required for printing can be performed. It is therefore possible to achieve a printing apparatus that is capable of simple operation and fast processing.

The above-described multiple function printer 1 reverses the cut-sheet form 5 after an MICR read command is received from the host. In addition, the cut-sheet form 5 is reversed immediately after a cut-sheet form 5 inserted in the insertion opening 10 is detected by the TOF detector 24. Yet further, the re-magnetizing process is executed immediately before MICR character 5a reading. However, it will be apparent to those skilled in the art, in light of the foregoing description, that the multiple function printer 1 of the present invention can be alternatively designed to receive an MICR character read command from the host after the cut-sheet form 5 is inserted in the insertion opening 10. In this case the re-magnetizing process can be performed immediately after the cut-sheet form 5 is inserted in the insertion opening 10. Alternatively, re-magnetizing can occur immediately before the reading process after the MICR character read command is received.

As also described above, the TOF detector 24 detects the leading edge 5b of a cut-sheet form 5 both when it is inserted in the insertion opening 10 and when it is reversed in a multiple function printer 1 according to this preferred embodiment. However, it will also be apparent to those skilled in the art, in light of the foregoing description, that the multiple function printer 1 of the present invention can be alternatively designed to provide a detector dedicated to detecting a cut-sheet form 5 inserted to the insertion opening 10. The location of such an additional detector is not limited to any specific place, and can be between the magnetizing magnet 17 and form stopper 16, or between the magnetizing magnet 17 and the open side of the insertion opening 10.

A multiple function printer according to this preferred embodiment as described above comprises a form stopper 16 for positioning a cut-sheet form inserted to the insertion opening 10 by contact between the cut-sheet form and the form stopper 16. However, it will be obvious to those skilled in the art, in light of the foregoing description, that the present invention shall not be so limited. The present invention can also be achieved, for example, with a construction where a pair of mutually touching transportation rollers are provided and the leading edge of a cut-sheet form inserted into the insertion opening is stopped in contact with the contact surface between the rollers. Yet further, alternatively, the present invention can be achieved using a simple construction having an index mark indicating a normalized cut-sheet form insertion position, and the operator inserting the cut-sheet form aligned to this mark. More specifically, it is sufficient to have a guide for guiding a cut-sheet form inserted to the insertion opening to a specific defined position. If a pair of transportation rollers as thus described is used and the form is touching the contact surface, the rollers can be driven to transport the form. If an index mark is used, a transportation roller or other known transportation mechanism can be used to grasp and transport the form.

It will also be apparent from the foregoing description that the present invention can also be applied to a printing apparatus having no form stopper, index mark, or other guide mechanism. This is because the above-noted guide mechanism is provided solely to improve the ease of operation for the operator. In this case, when the form is detected continuously for a predetermined time by the TOF detector, the transportation mechanism is driven to hold and transport the form. All other aspects of the process and operation are as described above.

Effects of the Invention

As described above, a printing apparatus and control method therefore according to the present invention transports a cut-sheet form set in the insertion opening in reverse to set a magnetic pattern on the cut-sheet form within an area where the flux density is strong enough to re-magnetize the magnetic pattern. The entire magnetic pattern can therefore be reliably re-magnetized by then advancing the cut-sheet form in the normal forward direction from this predetermined position. By thus reversing the cut-sheet form, it is possible by means of the present invention to adjust the position of an inserted cut-sheet form to a position appropriate to re-magnetizing the magnetic pattern even when the form is not inserted in the same position in the insertion opening due to differences in operator experience or how the cut-sheet form was inserted. It is therefore possible to avoid the problems resulting from a signal waveform corresponding to the magnetic pattern not being detected because all of the magnetic pattern was not re-magnetized, and a printing apparatus featuring excellent ease of use, operability, and reliability can be provided.

While the invention has been described in conjunction with specific embodiments, it will be evident to those skilled in the art in light of the foregoing description that many further alternatives, modifications and variations are possible. The invention described herein is intended to embrace all such alternatives, modifications, applications and variations as may fall within the spirit and scope of the appended claims.

What is claimed is:

1. A printing apparatus comprising:
    an insertion opening to receive a recording medium;
    a printing mechanism to print on the recording medium received in the insertion opening;
    a magnetizer to re-magnetize a magnetic pattern if such a magnetic pattern is imprinted on the recording medium;
    a magnetic pattern detector to detect the magnetic pattern re-magnetized by the magnetizer;
    a recording medium detector, disposed between the magnetizer and the magnetic pattern detector, to detect the recording medium;
    a transportation mechanism to selectively transport the recording medium detected by the recording medium detector in a first direction from the magnetizer toward the magnetic pattern detector and in a second direction opposite the first direction; and
    a controller for controlling the transportation mechanism to transport the recording medium in the first direction to print on the recording medium if the recording medium does not have a magnetic pattern imprinted thereon, and in the second direction, if the recording medium has a magnetic pattern imprinted thereon, to position a beginning of the magnetic pattern within the insertion opening where the flux density of the magnetizer is sufficient to re-magnetize the beginning of the magnetic pattern.

2. A printing apparatus according to claim 1, wherein the controller controls the transportation mechanism to transport the recording medium in the second direction until the beginning of the magnetic pattern is at least approximately aligned with a center of the magnetizer.

3. A printing apparatus according to claim 1, wherein the controller controls the transportation mechanism to transport the recording medium in the second direction until the leading edge of the recording medium is detected by the recording medium detector, and then further transports the recording medium in the second direction a predetermined distance.

4. A printing apparatus according to claim 1, wherein, after the recording medium detector detects the recording medium, the controller controls the transportation mechanism to transport the recording medium in the second direction until the beginning of the magnetic pattern is positioned within the insertion opening where the flux density of the magnetizer is sufficient to re-magnetize the beginning of the magnetic pattern.

5. A printing apparatus according to claim 1, wherein, before the recording medium is transported toward the magnetic pattern detector, the controller controls the transportation mechanism to transport the recording medium in the second direction until the beginning of the magnetic pattern is positioned within the insertion opening where the flux density of the magnetizer is sufficient to re-magnetize the beginning of the magnetic pattern.

6. A printing apparatus according to claim 1, wherein, after the recording medium detector detects the recording medium, the controller controls the transportation mechanism to transport the recording medium in the second direction until the beginning of the magnetic pattern is at least approximately aligned with a center of the magnetizer.

7. A control method for controlling a printing apparatus having a magnetizer and a magnetic pattern detector, said control method comprising the steps of:
    (a) detecting a recording medium set in an insertion opening of the printing apparatus;
    (b) determining whether the recording medium has a magnetic pattern imprinted thereon;
    (c) transporting the recording medium in a first direction from the magnetizer toward the magnetic pattern detector to print on the recording medium if it is determined in step (b) that the recording medium does not have a magnetic pattern imprinted thereon;
    (d) transporting the recording medium in a second direction opposite the first direction, if it is determined in step (b) that the recording medium has a magnetic pattern imprinted thereon, to position a beginning of the magnetic pattern within the insertion opening where the flux density of the magnetizer is sufficient to re-magnetize the magnetic pattern; and
    (e) transporting the recording medium in the first direction to read the re-magnetized magnetic pattern using the magnetic pattern detector if it is determined in step (b) that the recording medium has a magnetic pattern imprinted thereon.

8. A control method according to claim 7, wherein, in step (d), the recording medium is transported until the beginning of the magnetic pattern is at least approximately aligned with a center of the magnetizer.

9. A control method according to claim 7, wherein step (d) comprises the steps of:
    (1) transporting the recording medium in the second direction until the leading edge of the recording medium is detected; and
    (2) then further transporting the recording medium in the second direction a predetermined distance.

10. A control method according to claim 7, wherein steps (c) and (d) are performed after the recording medium is detected in said step (a).

11. A computer-readable medium storing a computer program which implements a control method for controlling a printing apparatus having a magnetizer and a magnetic pattern detector, the control method comprising the steps of:
    (a) detecting a recording medium received in an insertion opening of the printing apparatus;
    (b) determining whether the recording medium has a magnetic pattern imprinted thereon;

(c) transporting the recording medium in a first direction from the magnetizer toward the magnetic pattern detector if it is determined in said step (b) that the recording medium does not have a magnetic pattern imprinted thereon;

(d) transporting the recording medium in a second direction opposite the first direction, if it is determined in step (b) that the recording medium has a magnetic pattern imprinted thereon, to position a beginning of the magnetic pattern within the insertion opening where the flux density of the magnetizer is sufficient to re-magnetize the magnetic pattern; and (e) transporting the recording medium in a first direction to read the re-magnetized magnetic pattern using the magnetic pattern detector if it is determined in step (b) that the recording medium has a magnetic pattern imprinted thereon.

12. A computer-readable medium according to claim 11, wherein, in step (d), the recording medium is transported until the beginning of the magnetic pattern is at least approximately aligned with a center of the magnetizer.

13. A computer-readable medium according to claim 11, wherein step (d) of the control method comprises the steps of:

(1) transporting the recording medium in the second direction until the leading edge of the recording medium is detected; and (2) then further transporting the recording medium in the second direction a predetermined distance.

14. A computer-readable information storage medium according to claim 11, wherein step (c) and step (d) of the control method is performed after the recording medium is detected in said step (a).

15. A recording medium processing apparatus comprising:

an insertion opening to receive a recording medium;

a magnetizer to re-magnetize a magnetic pattern if such a magnetic pattern is imprinted on the recording medium;

a magnetic pattern detector to detect the magnetic pattern re-magnetized by the magnetizer;

a recording medium detector, disposed between the magnetizer and the magnetic pattern detector, to detect the recording medium;

a transportation mechanism to selectively transport the recording medium detected by the recording medium detector in a first direction from the magnetizer toward the magnetic pattern detector and in a second direction opposite the first direction; and a controller for controlling the transportation mechanism to transport the recording medium in the first direction to process the recording medium if the recording medium does not have a magnetic pattern imprinted thereon, and in the second direction, if the recording medium has a magnetic pattern imprinted thereon, to position a beginning of the magnetic pattern within the insertion opening where the flux density of the magnetizer is sufficient to re-magnetize the beginning of the magnetic pattern.

16. A recording medium processing apparatus according to claim 15, wherein the controller controls the transportation mechanism to transport the recording medium in the second direction until the leading edge of the recording medium is detected by the recording medium detector, and then further transports the recording medium in the second direction a predetermined distance.

17. A control method for controlling a recording medium processing apparatus having a magnetizer and a magnetic pattern detector, said control method comprising the steps of:

(a) detecting a recording medium set in an insertion opening of the processing apparatus;

(b) determining whether the recording medium has a magnetic pattern printed thereon;

(c) transporting the recording medium in a first direction from the magnetizer toward the magnetic pattern detector if it is determined in step (b) that the recording medium does not have a magnetic pattern imprinted thereon;

(d) transporting the recording medium in a second direction opposite the first direction, if it is determined in step (b) that the recording medium has a magnetic pattern imprinted thereon, to position a beginning of the magnetic pattern within the insertion opening where the flux density of the magnetizer is sufficient to re-magnetize the magnetic pattern; and (e) transporting the recording medium in the first direction to read the re-magnetized magnetic pattern using the magnetic pattern detector if it is determined in step (b) that the recording medium has a magnetic pattern imprinted thereon.

18. A control method according to claim 17, wherein step (d) comprises the steps of:

(1) transporting the recording medium in the second direction until the leading edge of the recording medium is detected; and (2) then further transporting the recording medium in the second direction a predetermined distance.

19. An MICR reader device for magnetizing MICR characters on a check using a permanent magnet and for reading the magnetized MICR characters using an MICR head, comprising:

an insertion slot for inserting the check;

a form stopper, provided at the insertion slot, for setting the check so that, after insertion, the check is abutted against the form stopper with at least some of the MICR characters positioned between the permanent magnet and the form stopper; and a mechanism for transporting the check from its abutted position in a reverse direction with respect to the form stopper and then for transporting the check in a forward direction, so that at least the MICR characters positioned between the permanent magnet and the form stopper when the check is abutted against the form stopper will be re-magnetized.

\* \* \* \* \*